Jan. 27, 1953 M. C. PETERSON 2,626,539
ADJUSTABLE REARVIEW MIRROR
Filed July 7, 1950
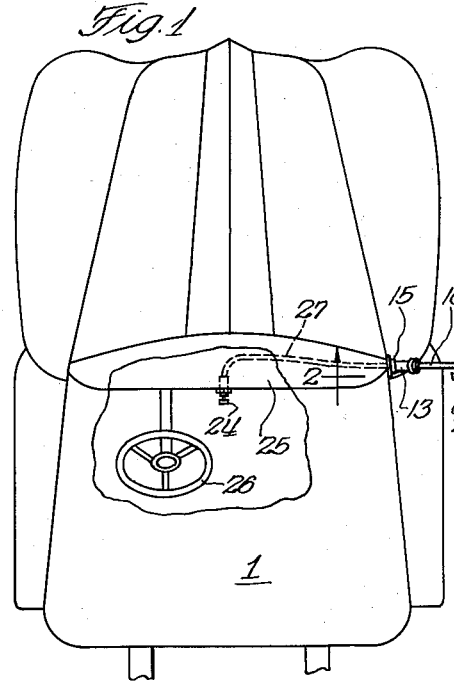
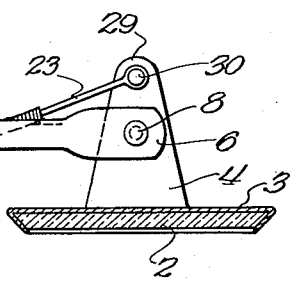
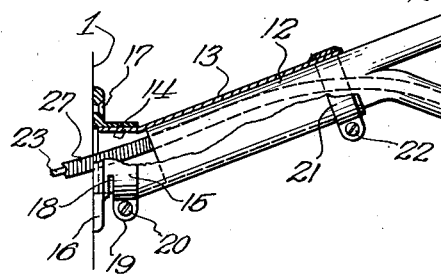
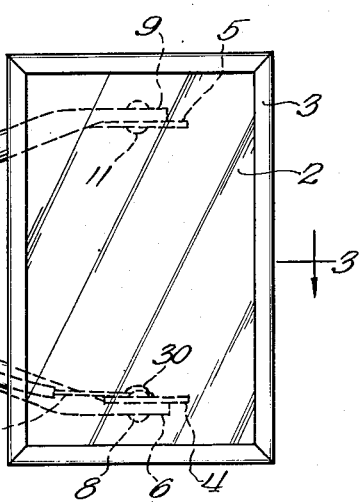
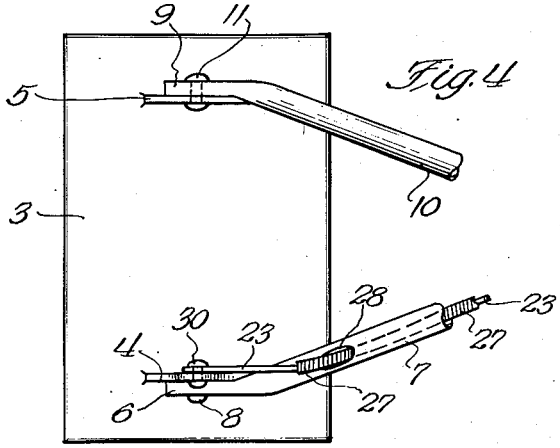
INVENTOR.
Milton C. Peterson
BY Oliver D. Olson
HIS AGENT Patented Jan. 27, 1953

2,626,539

UNITED STATES PATENT OFFICE 2,626,539

ADJUSTABLE REARVIEW MIRROR

Milton C. Peterson, Lakeside, Wash., assignor to J. E. M. Co., Portland, Oreg., a corporation of Oregon Application July 7, 1950, Serial No. 172,465

2 Claims. (Cl. 88—93)

This invention pertains to rear view mirrors, and relates particularly to a rear view mirror constructed for convenient mounting upon the side of a vehicle and adjustable from within the said vehicle.

It is a principal object of the present invention to provide a rear view mirror constructed in such manner as to permit adjustment thereof from a control knob located upon the dash panel of the vehicle to which said mirror is secured.

Another important object of this invention is the provision of a rear view mirror in which a centrally pivoted bracket is actuated by cable means secured to one end thereof for adjusting the position of a mirror mounted at the opposite end of said bracket.

A further object is the provision of an adjustable rear view mirror of sturdy but simplified, and therefore economical, construction.

These and other objects and advantages of this invention will appear from the following detailed description taken in connection with the accompanying drawing, in which:

Figure 1 is a plan view of a truck cab showing mounted thereon a side view mirror embodying the features of the present invention and the manner in which adjustment of said mirror is controlled, parts thereof being broken away to disclose details of installation;

Figure 2 is a side elevation taken along the line 2—2 in Figure 1 with parts being broken away to disclose details of construction;

Figure 3 is a fragmentary sectional view taken along the line 3—3 in Figure 2; and Figure 4 is a fragmentary rear elevation of the mirror shown in Figure 2.

Stated broadly, the present invention comprises a side view mirror in which a bracket supporting said mirror is mounted pivotally intermediate its ends for adjustment by cable means secured to the terminal end of the bracket and controlled from the interior of the vehicle.

Referring to the drawing, the side view mirror is shown in Figure 1 mounted upon the right side of a truck cab 1, although it will be apparent that said mirror may be mounted upon either side of various types of vehicles. A mirror 2 is mounted in a frame 3 constructed preferably of metal for maximum protection of the glass. A pair of brackets 4 and 5 are secured in spaced relation to the frame 3 and project rearwardly therefrom. Bracket 4 extends rearwardly a greater distance than bracket 5 for purposes now to be explained.

Bracket 4 is secured pivotally intermediate its ends to the terminal end 6 of tubular arm 7 by means of rivet 8 or other well-known type of securing device. In similar manner, bracket 5 is secured pivotally to the terminal end 9 of arm 10 by rivet 11. In this case, however, the pivotal connection is made adjacent the terminal end of bracket 5 because the latter is shorter than bracket 4. It will be apparent that brackets 4 and 5 may be of equal length and that the terminal ends 6 and 9, respectively, may be secured pivotally intermediate the ends of said brackets. The free end of but one of said brackets will be utilized, however, as described in detail hereinafter. For purposes of the appended claims, both brackets are to be considered as being supported intermediate their respective ends, notwithstanding that bracket 5 is shown supported adjacent its free end. The rivets 8 and 11 are arranged in axial alignment.

Arms 7 and 10 converge from their spaced ends 6 and 9, respectively, to join the tubular section 12. Said tubular section is proportioned and arranged to telescope into a tubular extension 13. As shown in the drawing, the extension 13 is offset at the end opposite the receiving end for section 12. Said offset section 14 is received detachably within a socket 15 formed in the base support 16. The base support is secured to the side of the cab 1 by means of bolts 17 in conventional manner.

The socket 15 is formed with a partial circumferential slot 18 adjacent the base 16. The socket is also split longitudinally and provided with projecting tabs 19 which may be drawn together by bolt 20. In this manner the circumference of the socket 15 may be decreased by tightening bolt 20, whereby to grip the offset section 14 securely therein. The tubular extension 13 is also slotted longitudinally adjacent its outer end and a collar 21, capable of being tightened by bolt 22, is placed thereon. As bolt 22 is tightened, the collar draws the slotted end of extension 13 into gripping engagement with the tubular section 12. The latter is thereby held against longitudinal and axial displacement relative to the said extension 13.

It is apparent that the vertical position of the mirror 2 may be changed either by rotating the offset section 14 of extension 13 within collar socket 15 by loosening bolt 20, or by loosening bolt 22 and rotating the section 12. The latter operation also permits extension of the mirror from the cab by virtue of the telescoping sections 12 and 13.

Adjustment of the mirror about its vertical axes 8 and 11 is accomplished from within the cab as follows: A control wire 23 is secured at one end to a knob 24 mounted upon the dash panel 25 adjacent the steering wheel 26 of the vehicle. The control wire is contained slidably within a flexible hollow cable 27 and extends laterally along the dash panel and through a hole in the side of the cab 1. The cable-enclosed wire then passes through the hollow socket 15, tubular section 12 and thence along hollow arm 7 to a point adjacent the terminal end 6. The wire and cable emerge from the hollow arm 7 through a hole 28 provided on the side of arm 7 facing the projecting end 29 of bracket 4. Wire 23 is secured pivotally to said projecting end 29 by means of pin 30.

In operation, referring to Figures 1 and 3, as the knob 24 is pulled outwardly from the dash panel, the bracket 4 is pivoted in a counterclockwise direction about pin 8, whereupon the mirror is directed outwardly from the vehicle. Conversely, the mirror is pivoted toward the vehicle when the control knob is pushed inwardly toward the dash panel.

It will be apparent to those skilled in the art that various details of the construction described hereinbefore may be changed without departing from the scope and spirit of the present invention. For example, the bifurcated end of section 12, which comprises the arms 7 and 10, may be replaced with a single arm pivotally supporting a mirror by means of a bracket similar in construction to bracket 4. The two arms illustrated in the drawing provides greater support and rigidity and is therefore preferred.

Having now described my invention and the manner in which the same may be used, what I claim as new and desire to secure by Letters Patent is:

1. A rear view mirror for a vehicle, comprising a mirror, a mirror frame, spaced brackets projecting from said frame, a bifurcated member forming spaced arms at one end thereof, at least one of said arms being of tubular cross section, said spaced arms being secured pivotally to said brackets intermediate the ends of the latter, a cable secured at one end to the free end of one of the intermediately pivoted brackets, said cable entering the tubular arm adjacent the pivotal connection of the latter with said bracket and extending through said tubular arm into said vehicle, and control means within the vehicle connecting said cable for adjusting the position of said mirror.

2. A rear view mirror for a vehicle, comprising a mirror, a mirror frame, spaced brackets projecting from said frame, a bifurcated tubular member forming spaced arms at one end thereof, socket means proportioned and arranged for mounting on said vehicle and supporting a tubular extension adjustably therein, the single end of said tubular member being receivable telescopically in said tubular extension, said spaced arms being secured pivotally to said brackets intermediate the ends of the latter, a cable secured at one end to the free end of one of the intermediately pivoted brackets, said cable entering the tubular arm adjacent the pivotal connection of the latter with said bracket and extending through said tubular arm, tubular extension and socket means into said vehicle, and control means within the vehicle connecting said cable for adjusting the position of said mirror.

MILTON C. PETERSON.

REFERENCES CITED

The following references are of record in the file of this patent:

UNITED STATES PATENTS

| Number | Name | Date |
|---|---|---|
| 1,684,560 | Scott | Sept. 18, 1928 |
| 2,260,597 | Beattie | Oct. 28, 1941 |
| 2,315,260 | Lancaster | Mar. 30, 1943 |
| 2,319,745 | Napoli | May 18, 1943 |
| 2,330,444 | Park | Sept. 28, 1943 |
| 2,341,208 | Clark et al. | Feb. 8, 1944 |